United States Patent
Lee et al.

(10) Patent No.: US 9,907,000 B2
(45) Date of Patent: Feb. 27, 2018

(54) METHOD AND APPARATUS FOR IDENTIFYING MICROCELLS IN MACROCELLS IN WIRELESS COMMUNICATION SYSTEMS, AND HANDOVER METHOD AND SYSTEM USING SAME

(71) Applicant: Samsung Electronics Co., Ltd., Suwon-si, Gyeonggi-do (KR)

(72) Inventors: Kang-Yong Lee, Suwon-si (KR); Seong-Joon Kim, Busan (KR); Yun-Sang Park, Suwon-si (KR); Byoung-Jae Bae, Suwon-si (KR); Byeong-Yun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 14/377,686

(22) PCT Filed: Feb. 8, 2013

(86) PCT No.: PCT/KR2013/001048
§ 371 (c)(1),
(2) Date: Aug. 8, 2014

(87) PCT Pub. No.: WO2013/119081
PCT Pub. Date: Aug. 15, 2013

(65) Prior Publication Data
US 2015/0056989 A1    Feb. 26, 2015

(30) Foreign Application Priority Data

Feb. 10, 2012   (KR) .................. 10-2012-0013937

(51) Int. Cl.
*H04W 36/00* (2009.01)
*H04W 36/04* (2009.01)
*H04W 48/16* (2009.01)

(52) U.S. Cl.
CPC ....... *H04W 36/04* (2013.01); *H04W 36/0061* (2013.01); *H04W 48/16* (2013.01)

(58) Field of Classification Search
None
See application file for complete search history.

(56) References Cited

U.S. PATENT DOCUMENTS

| 2011/0151859 A1 | 6/2011 | Lee et al. |
| 2013/0058234 A1* | 3/2013 | Yang ..................... H04L 27/261 370/252 |

FOREIGN PATENT DOCUMENTS

| KR | 10-2010-0080445 A | 7/2010 |
| KR | 10-2011-0073251 A | 6/2011 |
| KR | 10-2011-0130350 A | 12/2011 |

OTHER PUBLICATIONS

R1-110160, Pantech, "Methods to inform femto-specific ABS pattern", 3GPP TSG RAN WG1 Meeting #63bis, Jan. 17-21, 2011.
(Continued)

*Primary Examiner* — Suhail Khan
(74) *Attorney, Agent, or Firm* — Jefferson IP Law, LLP (57) ABSTRACT

The present invention relates to a method for identifying a microcell in a macrocell including the steps of: a User Equipment (UE) obtaining a physical identity of the microcell by performing cell search on an adjoining microcell; and the UE identifying the microcell by using a specific pattern of a sub-frame transmitted by the microcell.

23 Claims, 5 Drawing Sheets

(56) References Cited

OTHER PUBLICATIONS

3GPP TS 36.331 v10.1.0, Mar. 2011.
3GPP TS 36.300 v10.3.0, Mar. 2011.
3GPP TS 36.300 v11.0.0, Dec. 22, 2011.

* cited by examiner

METHOD AND APPARATUS FOR IDENTIFYING MICROCELLS IN MACROCELLS IN WIRELESS COMMUNICATION SYSTEMS, AND HANDOVER METHOD AND SYSTEM USING SAME

PRIORITY

This application is a National Phase Entry of PCT International Application No. PCT/KR2013/001048, which was filed on Feb. 8, 2013, and claims a priority to Korean Patent Application No. 10-2012-0013937, which was filed on Feb. 10, 2012, the contents of which are incorporated herein by reference.

TECHNICAL FIELD

The present disclosure relates to a method and apparatus for identifying microcells in a wireless communication system, and handover method and system using the same.

BACKGROUND ART

Wireless networks have been developed into a form of a heterogeneous network (HetNet) to improve general wireless network performance and meet user demands, as well as to efficiently correspond to a relatively higher user's traffic demand in a particular area. The HetNet may be understood as a wireless network in a form where a macrocell and microcells like pico cells, femto cells, Closed Subscriber Group (CSG) cells, etc., are overlapped. For example, the CGS cell refers to a cell that provides a service only to a subscriber group authorized to use the service.

The HetNet environment is affected largely by a huge difference in transmit power between the macrocell and the microcell and interference due to the CSG cell. In the case of the CSG cell among the microcells, only authorized users are serviced and thus the CSG cell interferes with the user of the macrocell. In the case of the pico cells and femto cells among the microcells, the macrocell having relatively large transmit power affects the user of the microcell. Such an effect of interference makes it difficult to determine an optimal time for handover between the macrocell and the microcell.

In the following specification, explanation will be focused on interference between a macrocell and a CSG cell. Since the number of Physical Cell IDs (PCIs) for identification of the CSG cells is limited, PCI confusion may occur between the CSG cells.

Specifically, in the case of CSG cells, a PCI region only for the CSG cells is set and CSG cells located within an area of a single macrocell may use the same PCI. In this case, during handover from the macrocell to a CSG cell, PCI overlapping may occur, in which case a target cell may not be determined only with a PCI of the CSG cell. The PCI overlapping becomes a factor that makes it difficult to correctly identify a CSG cell during handover from the macrocell to the CSG cell.

With rapid advancements in communication services, it is expected that (e.g., thousands to tens of thousands) CSG cells and microcells greater in number than CSG cells (having the maximum number of about 500) distinguishable only with the PCI operate in the service area of a macrocell.

However, it is difficult to check proximity to a microcell, such as a CSG cell or check separation from a microcell in a macrocell, and to correctly identify a microcell, and thus a scheme to address the difficulty is required.

DISCLOSURE

Technical Problem

The present disclosure provides a method and apparatus for easily identifying a microcell within a macrocell in a wireless communication system.

The present disclosure also provides a method for identifying a Closed Subscriber Group (CSG) cell, by which proximity to or separation from the CSG cell may be easily determined.

The present disclosure also provides a method and system for handing over to a CSG cell in a wireless communication system.

Technical Solution

In accordance with an aspect of the present disclosure, a method for identifying a microcell within a macrocell in a wireless communication system is provided. The method includes a User Equipment (UE) obtaining a physical identity of the microcell by performing cell search on an adjoining microcell; and the UE identifying the microcell by using the physical identity and a particular pattern of a subframe sent by the microcell.

In accordance with another aspect of the present disclosure, a User Equipment (UE) for identifying a microcell within a macrocell in a wireless communication system is provided. The UE includes a transceiver for transmitting and receiving wireless signals; and a controller for obtaining a physical identity of the microcell by performing cell search on an adjoining microcell; and identifying the microcell by using the physical identity and a particular pattern of a subframe sent by the microcell.

In accordance with another aspect of the present disclosure, a handover method from a macrocell to a microcell in a wireless communication system is provided. The method includes a User Equipment (UE) obtaining a physical identity of the microcell by performing cell search on an adjoining microcell; the UE identifying the microcell by using the physical identity and a particular pattern of a subframe sent by the microcell; a source eNB of the macrocell receiving system information resulting from identification of the microcell from the UE; and a target eNB of the microcell responding to a handover request from the source eNB and the source eNB sending a handover command to the UE.

In accordance with another aspect of the present disclosure, a wireless communication system that supports handover from a macrocell to a microcell is provided. The wireless communication system includes a User Equipment (UE) for obtaining a physical identity of an adjoining microcell by performing cell search on the microcell; and identifying the microcell by using the physical identity and a particular pattern of a subframe sent by the microcell; a source eNB of the macrocell for receiving system information resulting from identification of the microcell from the UE and send a handover command to the UE according to a handover procedure; and a target eNB of the microcell for responding to a handover request from the source eNB.

BEST MODE

Embodiments of the present disclosure will be described in conjunction with accompanying drawings. In the description of the present disclosure, if it is determined that a detailed description of commonly-used technologies or structures related to the disclosure may unnecessarily obscure the subject matter of the invention, the detailed description will be omitted.

While the embodiments of the present disclosure will be described assuming Closed Subscriber Group cells among microcells for convenience, it should be noted that the present disclosure may be applied to identification for many different kinds of microcells that may affect the user of a macrocell in terms of interference and handover procedures between the macrocell and the microcell. To facilitate understanding of the following embodiments of the present disclosure, an existing method for identifying a CSG cell will be described first and then followed by description of a method for identifying a CSG cell in accordance with the embodiments of the present disclosure.

Figure 1:
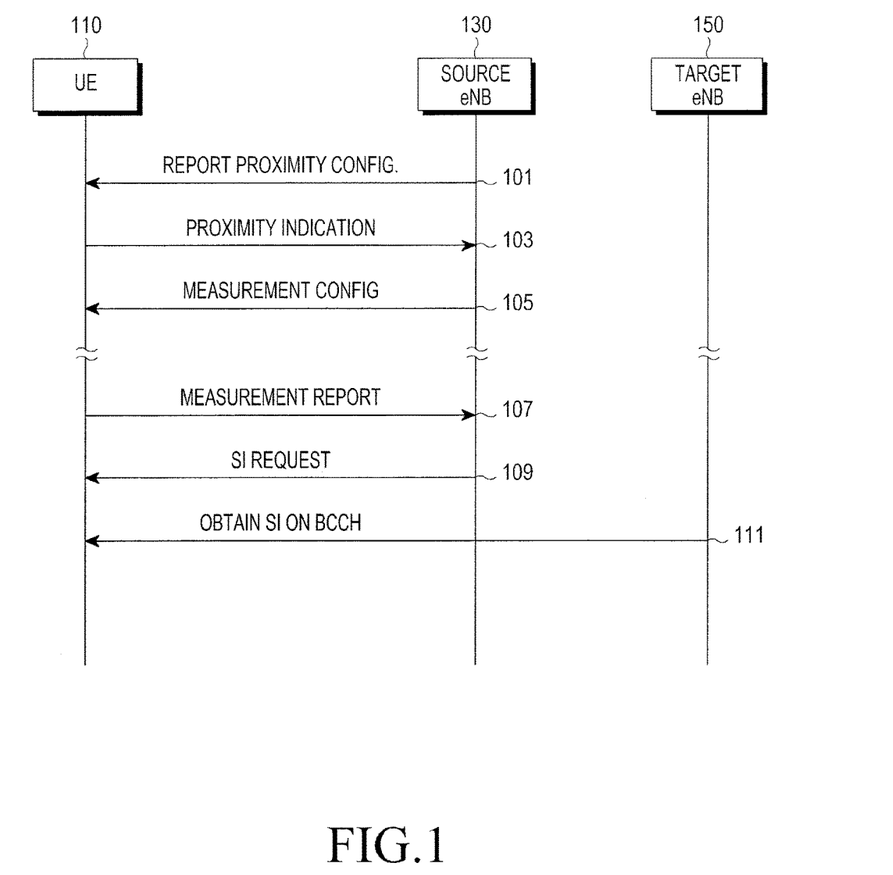
FIG. 1 is a flow chart illustrating a method for identifying a Closed Subscriber Group (CSG) cell in a wireless communication system of a related art.

FIG. 1 is a flow chart illustrating a method for identifying a CSG cell in a wireless communication system of a related art, which illustrates a process in which a User Equipment (UE) 110 identifies a CSG cell to hand over from a source eNB 130 to a target eNB 150.

In FIG. 1, assuming that the source eNB 130 is an eNB of a macrocell while the target eNB 150 is an eNB of a CSG cell, and although not shown, there are many CSG cells within the macrocell.

In operation 101, the UE 110 receives a proximity configuration message from the source eNB 130, the message instructing proximity indication. In operation 103, the UE 110 performs autonomous search proposed in an existing standard to indicate proximity to a CSG cell. The autonomous search is to notify a network that the UE 110 has entered a CSG cell on a white list when the entrance has occurred, which is described in 3GPP TS 36.300 v10.3.0.

However, considering e.g., the limited number of Physical Cell IDs (PCIs), the existing standards have not yet proposed any specific and efficient scheme for the autonomous search.

If there is no measurement configuration for measuring a frequency/wireless access technology of the CSG cell, the UE 110 receives a measurement configuration message from the source eNB 130 about cell search for the frequency/wireless access technology used by an adjoining CSG cell, in operation 105. In operation 107, the UE 110 performs cell search for the frequency/wireless access technology and obtains measurements as a result of the cell search including a PCI of the adjoining CSG cell. A measurement report including the PCI is sent to the source eNB 130. In operation 109, the source eNB 130 sends the UE 110 a request for System Information (SI) regarding the CSG cell of the PCI for handover, and in operation 111, the UE 110 performs measurement using an autonomous gap to obtain the SI.

With the autonomous gap, the UE 110 obtains the SI on a broadcasting channel (BCCH) transmitted by the target eNB 150 of the CSG cell to be handed over. The SI includes different kinds of information for handover, such as an ID of a CSG cell to be handed over (CSG ID), a Cell Group ID (CGI), a Tracking Area Identification (TAT), etc. The autonomous gap is described in the 3GPP TS 36.300 v10.3.0.

A procedure of the autonomous gap proposed by the existing standard may cause significant time delay during handover, which negatively affects normal operations of the UE 110.

Given that the method for identifying a CSG cell, which is proposed by the related art as shown in FIG. 1, does not suggest any specific and efficient scheme for proximity indication with the autonomous search and causes time delay in obtaining the SI using the autonomous gap to identify a CSG cell, the embodiments of the present disclosure proposes an improved method for identifying a CSG cell that may easily perform the proximity indication and easily obtain SI, such as e.g., a CSG ID without using the autonomous gap procedure.

In the embodiments of the present disclosure, a UE performs proximity indication by using a particular pattern of a subframe used by each CSG cell. The particular pattern of a subframe indicates, for example, a transmission interval (location) in which Almost Blank Subframe (ABS) is sent from a CSG cell for signal quality measurement of a serving cell. The particular pattern of a subframe may use, for example, an ABS pattern. Specifically, since a CSG cell causes interference with the user of the macrocell, the CSG cell sends a particular subframe indicated by the ABS pattern, for example, in the almost blank form, such as a null signal. Hereinafter, the subframe of a CSG cell sent in the almost blank form is referred to as the ABS.

Referring to existing standards 3GPP TS 36.331 v10.1.0; TS 36.331 v10.2.0, the ABS pattern is defined as "measSubframePatternServ", "measSubframePatternPCell", which is used for signal quality measurement of a serving cell (or primary cell). Based on a bit value indicated by the ABS pattern, signal quality of a serving cell, i.e., a macrocell, is measured. The ABS pattern is also defined as a serving cell measurement restriction pattern in the existing standard.

The ABS pattern is a term defined in the position of a cell that causes interference (e.g., a CSG cell) while the serving cell measurement restriction pattern is a term defined in the position of a cell that is interfered (e.g., a macrocell). Hereinafter, the two terms will be collectively called an 'ABS pattern'.

In the existing standard, the ABS pattern is defined to be given to a UE through "measSubframePattern-Serv", "measSubframePatternPCell" of RRC signaling, i.e., from a macrocell, which is a serving cell, and it is defined to use one ABS pattern.

However, in the embodiments of the present disclosure, a new method for identifying a CSG cell, by which the number of ABS patterns is extended to the multiple number and CSG cells are identified by mapping a combination of the ABS pattern and a PCI of a CSG cell to the CSG cell. Hence each CSG cell is mapped with a pair of (PCI, ABS pattern) in the embodiments of the present disclosure. On the other hand, transmission interval of the ABS among multiple subframes sent by a CSG cell is a blank interval that appears as if signals of the CSG cell are not be sent. Thus, the UE may better receive the signal of the macrocell without being interfered by the CSG cell in the ABS transmission interval.

The reception quality of the subframe sent by the macrocell in the ABS transmission interval is better than that of the subframe sent by the macrocell in typical subframe transmission intervals, because it is barely interfered by the CSG cell. If the ABS pattern is used to measure the reception quality of the macrocell in a situation where the UE connected to a macrocell approaches a CSG cell in the macrocell, the reception quality of the macrocell is better measured and the UE may maintain good quality of a service provided by the macrocell without being affected by interference from the CSG cell.

A method for a CSG cell to measure reception quality of a macrocell with ABS patterns will now be described in detail in accordance with embodiments of the present disclosure.

Assume that measurement of reception quality of the macrocell is performed on a subframe basis and different ABS patterns are used by multiple CSG cells. The UE measures reception quality of a subframe sent by the macrocell in a transmission interval in which the CSG cell sends the ABS, according to the ABS pattern. At the same time when the UE measures reception quality of the macrocell according to the ABS pattern, the UE also measures reception quality of the macrocell according to a reference pattern (hereinafter, referred to as 'pattern 0') used by the macrocell.

That is, in the embodiment of the present disclosure, reception quality measurement of the macrocell is performed using both the ABS pattern of the CSG cell and the pattern 0 of the macrocell. The ABS pattern and pattern 0 are each comprised of a bitstream of "0s" and "1s", and the bitsreams are different because the ABS pattern and pattern 0 are different from each other.

Each bit of the bitstream of the ABS pattern or the pattern 0 corresponds to a single subframe. For example, a bit value of "1" in the bitstream indicates that reception quality of the corresponding subframe of the macrocell is measured while a bit value of "0" indicates that reception quality of the corresponding subframe of the macrocell is not measured.

In the embodiment of the present disclosure, average reception quality of a macrocell, i.e., a serving cell, measured according to the ABS pattern is compared with average reception quality of the serving cell measured according to the pattern 0, and it is determined that the UE is adjacent to a CSG cell that uses an ABS pattern having the greatest difference in the reception quality, i.e., having the best reception quality of the serving cell. Furthermore, it is also possible to use accumulated reception quality instead of the average reception quality in measuring reception quality of the serving cell.

Specifically, the average reception quality of the serving cell, $E_n[M]$, may be measured using the following equations 1 and 2.

$$S_n[M] = \sum_i M_i \cdot P_n(i) = \sum_{\{i|P_n(i)==1\}} M_i \quad \text{[Equation 1]}$$

$$E_n[M] = \frac{S_n[M]}{\sum_i P_n(i)} \quad \text{[Equation 2]}$$

Attributes in the equations 1 and 2 are defined as follows:
$M_i$: reception quality in an $i^{th}$ subframe according to a measurement subframe pattern (i.e., ABS pattern having e.g., 40 bits in case of FDD)

$P_n$: $n^{th}$ ABS pattern of multiple ABS patterns.
$P_n(i)$: bit corresponding to $i^{th}$ subframe in the $n^{th}$ ABS pattern, $P_n$
$S_n[M]$: accumulated reception quality of a serving cell measured according to an ABS pattern $P_n$
$E_n[M]$: average reception quality of a serving cell measured according to an ABS pattern $P_n$ If a bit value of $P_n(i)$, a corresponding bit in the bitstreram, is "1", the UE measures reception quality of the serving cell in the $i^{th}$ subframe; or if the bit value is "0", the UE does not measure reception quality of the serving cell in the $i^{th}$ subframe.

Equation 2 is defined as accumulated reception quality $S_n[M]$ of the serving cell measured according to the nth ABS pattern being divided by a sum of counts of "1" of a bit value corresponding to the subframe indicated by the nth ABS pattern, i.e., the number of subframes on which measurement is performed, which means average reception quality of a serving cell per subframe according to the $n^{th}$ ABS pattern.

Provided that average reception quality of a serving cell measured according to the aforementioned method without taking into account any ABS pattern (i.e., with the pattern 0) is $E_0[M]$, the UE determines that it is adjacent to a CSG cell that uses an ABS pattern having the greatest difference between the average reception quality $E_N[M]$ of the serving cell measured according to the ABS pattern and average reception quality $E_0[M]$ of the serving cell measured according to the reference pattern, which is the pattern 0.

$$\max_n(E_n[M] - E_0[M]) \quad \text{[Equation 3]}$$

In the embodiment of the present disclosure, the pattern 0 may be created in various methods, such as, for example, a method for creating it to be different from the ABS pattern so that a target subframe of the serving cell for measurement is different from that according to the ABS pattern, a method for randomly selecting a target subframe of the serving cell for measurement, or a method for selecting all the subframes of the serving cell to be target subframes for measurement.

The pattern 0 may have a different form than multiple ABS patterns allocated to multiple CSG cells. For example, among N patterns having the same hamming distance, N−1 patterns may be used as ABS patterns while the remaining one may be used as the pattern 0. In another example, among N patterns having no correlation or weak correlations, N−1 patterns may be used as ABS patterns while the remaining one may be used as the pattern 0.

With the multiple ABS patterns, proximity indication and CSG cell identification may be performed simultaneously. Specifically, with combinations of the PCIs and ABS patterns in the CSG cell identification, the number of identifiers available for CSG cell identification may be steeply increased, and the CSG cell identification is possible only by utilizing both of the results of measurement for a macrocell which is the serving cell or of routine neighbor cell measurement.

For convenience, assuming a network situation where there are two CSG cells within a macrocell, the method for identifying a CSG cell in accordance with an embodiment of the present disclosure will now be described in more detail.

Assume an example where a UE uses three serving cell measurement restriction patterns as represented in Table 1 in a network where the macrocell is a serving cell and includes two CSG cells.

TABLE 1

| Pattern Type | Bitstream of Pattern | Target Cell |
| --- | --- | --- |
| Pattern 0 | 100100100 . . . | Macrocell |
| Pattern 1 | 010010010 . . . | First CSG Cell |
| Pattern 2 | 001001001 . . . | Second CSG Cell |

In Table 1, pattern 0 refers to a reference pattern for the macrocell; pattern 1 refers to an ABS pattern used by the first CSG cell; and pattern 2 is an ABS pattern used by the second CSG cell. The three different patterns illustrated in Table 1 are patterns all used in reception quality measurement of a serving cell, and respective bit values of bitstream of each pattern indicate whether to perform measurement in the corresponding subframes of the macrocell. In each pattern, if the bit value is "1", reception quality of a corresponding subframe sent by the macrocell is measured; and if the bit value is "0", reception quality of the corresponding subframe is not measured.

Furthermore, each CSG cell sends the ABS if the bit value of a corresponding ABS pattern is "1", and sends a typical subframe including e.g., transmit data of the CSG cell if the bit value is "0".

Figure 2:
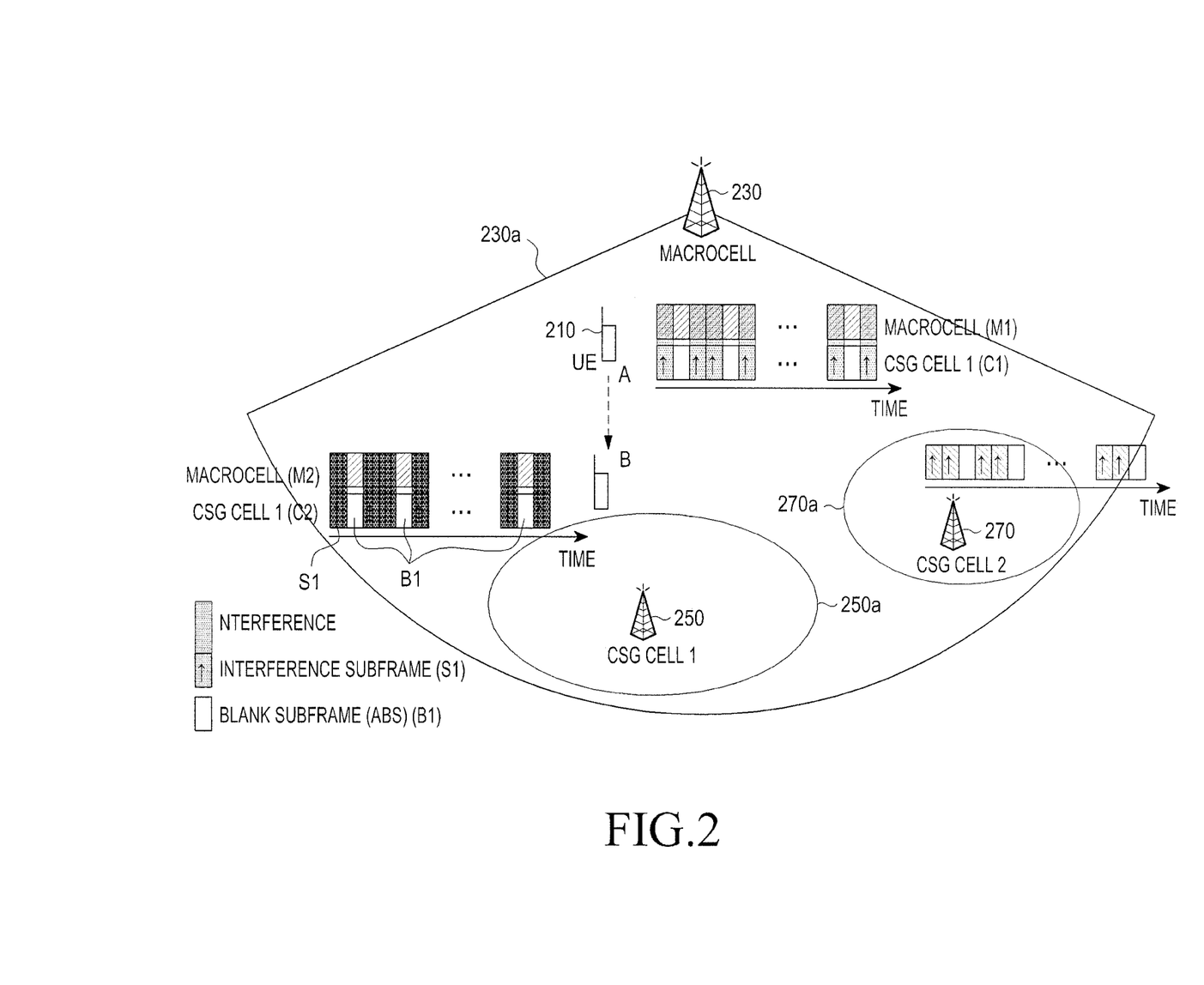
FIG. 2 is a diagram for explaining a method for determining whether a User Equipment (UE) approaches a CSG cell, according to an embodiment of the present disclosure.

FIG. 2 is a diagram for explaining a method for determining whether a UE approaches a CSG cell, according to an embodiment of the present disclosure, which facilitates multiple CSG cells to perform proximity indication and identification of CSG cells with different ABS patterns.

In FIG. 2, a UE 210 is connected to a macrocell in connection state and only a part of a service area 230a of an eNB 230 of the macrocell is illustrated for convenience of explanation. In the service area 230a of the macrocell, there are eNBs 250 and 270 of first and second CSG cells, respectively, and service areas 250a and 270a of the first and second CSG cells overlap the service area 230a of the macrocell. Thus, typical subframes sent by the first and second CSG cells interfere with the user of the macrocell.

In the network condition of FIG. 2, it is assumed that the UE 210 has moved from point A less interfered by the first and second CSG cells to point B adjacent to the first CSG cell in the macrocell. At point A, subframes C1 of the first CSG cell barely interfere with subframes M1 of the macrocell. However, at point B, since the UE 210 approaches the first CSG cell, subframes C2 of the first CSG cell causes relatively large interference to subframes M2 of the macrocell that the UE 210 receives.

In FIG. 2, the subframes C2 sent by the first CSG cell includes typical subframes S1 that interfere with the macrocell and ABSs B1 based on an ABS pattern. The UE 210 may receive better quality of signals sent by the macrocell in the transmission intervals of the ABSs B1.

When the UE 210 operates in the aforementioned condition, results of measuring reception quality of the macrocell with the serving cell measurement restriction pattern shown in Table 1 at points A and B are represented in the following Table 2. Here, point A is far distant from the first and second CSG cells, where there is almost no interference by the two CSG cells. Point B is adjacent to the first CSG cell and far from the second CSG cell, and is thus strongly interfered by the first CSG cell.

TABLE 2

| | A | B |
| --- | --- | --- |
| Pattern 0 | Good | Bad |
| Pattern 1 | Good | Good |
| Pattern 2 | Good | Bad |

The UE 210 may determine whether it approaches a particular CSG cell by comparing results of measuring reception quality of the macrocell according to respective measurement restriction patterns (patterns 1 and 2 in Table 1) corresponding to ABS patterns allocated differently to respective CSG cells and a result of measuring reception quality of the macrocell according to the reference measurement restriction pattern (pattern 0 in Table 1). According to the embodiment of the present disclosure, proximity indication and identification of CSG cells may be performed by performing routine measurement on a serving cell.

TABLE 3

| | A | B |
| --- | --- | --- |
| Pattern 1-0 | small | Big |
| Pattern 2-0 | small | small |

For example, in Table 3, pattern 1-0 indicates a difference between results of reception quality measurement of the macrocell measured using equation 3 for pattern 1 and pattern 0 of Table 1 at points A and B, respectively. Since the difference is small at point A of "pattern 1-0", the UE 210 determines that it is not in a state of approaching the first CSG cell. On the other hand, since the difference is big at point B of "pattern 1-0", the UE 210 determines that it is in a state of approaching the first CSG cell.

In Table 3, pattern 2-0 indicates a difference between results of reception quality measurement of the macrocell measured using equation 3 for pattern 2 and pattern 0 of Table 1 at points A and B, respectively. Since the difference is small at both of points A and B of "pattern 2-0", the UE 210 determines that it is not in a state of approaching the second CSG cell.

Accordingly, the UE 210 may measure reception quality of the macrocell with ABS patterns differently allocated to multiple CSG cells in the aforementioned method, and use the measurement results to easily perform proximity indication that indicates whether the UE approaches the CSG cell.

Various modifications of the embodiment of the present disclosure are possible by applying the embodiment to a Long Term Evolution (LTE) network under a HetNet environment that uses multiple CSG cells.

(1) Method for Identifying a CSG Cell with an ABS Pattern allocating different ABS patterns to CSG cells;
allocating different pairs of (PCI, ABS pattern) to CSG cells, where CSG cells allocated different PCIs may be allocated the same ABS pattern;
using a pair of (PCI, ABS pattern) to identify a CSG cell.

(2) Method for Obtaining a CSG ID After Identification of a CSG Cell configuring an ABS pattern to include a CSG ID (having e.g., 27 bits);
storing mapping information between the ABS pattern and the CSG ID in the eNB, and obtaining a CSG ID by informing the eNB of an ABS pattern selected by the UE; or providing mapping information between the ABS pattern and the CSG ID to the UE in advance, and identifying a CSG ID mapped to an ABS pattern selected by the UE.

(3) Method for Measuring Reception Quality of a Macrocell on a Subframe Basis measuring reception quality of a data signal included in a subframe;

measuring reception quality of a Reference Signal (RS) included in a subframe. In case of measuring the reception quality of the RS, measurement is performed by separating a case where the arrangement of the RS in the subframe is identical between the macrocell and the CSG cell from a case where the arrangement is different between them.

(4) Method for Proximity Indication and CSG Cell Identification according to reception quality of a macrocell on a subframe basis, determining to be "1" if reception quality is good and to be "0" if it is not good, comparing them with ABS pattern of a CSG cell, and determining that it approaches a corresponding CSG cell if the bitstreams match;

determining whether it approaches a CSG cell by measuring reception quality of the macrocell according to ABS patterns, accumulating or averaging the reception quality, and comparing the accumulated reception quality or average reception quality with a predetermined reference value;

comparing average reception quality or accumulated reception quality measured according to ABS patterns with average reception quality or accumulated reception quality measured according to a reference pattern of the macrocell, determining to be far distant from a CSG cell of a corresponding ABS pattern if the difference is small and determining to be adjacent to a CSG cell of a corresponding ABS pattern if the difference is big.

Furthermore, in a case the embodiment of the present disclosure is applied to the LTE network after e.g., 3GPP release 10, the following embodiment is proposed.

However, the following embodiment is not necessarily limited to the LTE network after 3GPP release 10 but may also be applied to various wireless communication networks where there are multiple CSG cells within a macrocell.

(1) UE performs cell search on an adjoining cell (i.e., CSG cell) and obtains a PCI of the CSG cell through the cell search.

(2) a CSG cell is identified using a pair of (PCI, ABS pattern) allocated to the CSG cell. Since a combination of a PCI and an ABS pattern is used in identification of a CSG cell, the number of PCIs and ABS patterns required for the CSG cell identification may be reduced.

Information about the pair of (PCI, ABS pattern) may be provided by at least one of the CSG cell and macrocell to the UE.

In the embodiment, different PCIs and identical ABS pattern are allocated to adjoining CSG cells. This is to distinguish sets (groups) of CSG cells according to ABS patterns.

Furthermore, the current 3GPP RRC (release 10, March, 2011) standard regulates that only one serving cell measurement restriction pattern be used, but in the embodiment of the present disclosure, multiple serving cell measurement restriction patterns are used. Accordingly, a single pattern 0 and multiple ABS patterns are used to measure reception quality of a serving cell (macrocell). In addition, accessible CSG cells may be identified from a white list of CSG cells, and a method for sending only a corresponding measurement restriction pattern may reduce the RRC signaling overhead.

Figure 3:
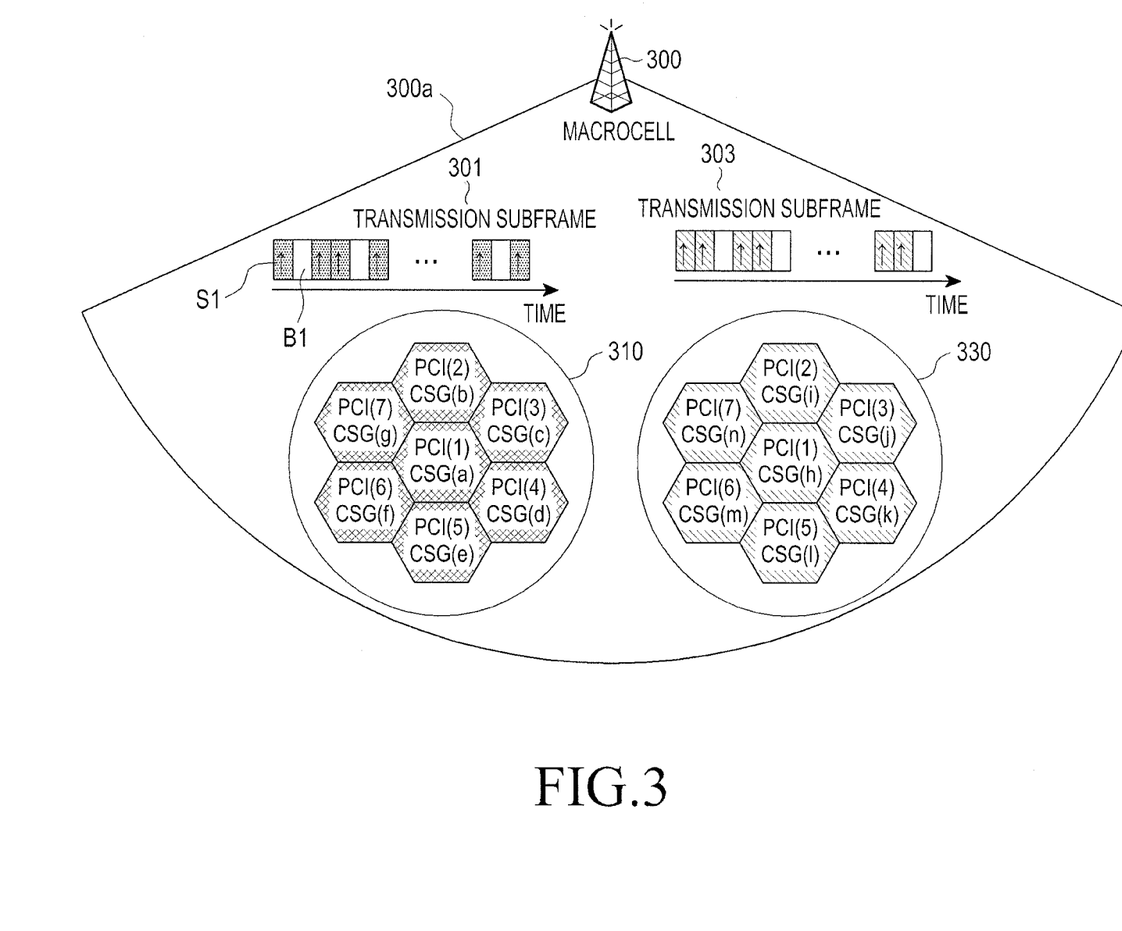
FIG. 3 is a diagram for explaining a method for identifying a CSG cell, according to an embodiment of the present disclosure.

FIG. 3 is a diagram for explaining a method for identifying a CSG cell, according to an embodiment of the present disclosure, which indicates an example of a method for identifying a CSG cell, by which a pair of (PCI, ABS pattern) is allocated to each CSG cell.

Referring to FIG. 3, for convenience of explanation, a part of service area 300a of an eNB 300 of a macrocell is shown. In the service area 300a of the macrocell, adjoining CSG cells that use the same ABS pattern are divided into two groups. Assuming that the two CSG cell groups are a first CSG cell group 310 and a second CSG cell group 330, first adjoining CSG cells included in the first CSG cell group 310 use the same ABS pattern but are allocated different PCIs. Second adjoining CSG cells included in the second CSG cell group 330 use the same ABS pattern, which is different from the ABS pattern used by the first CSG cells, but are allocated different PCIs. Furthermore, in FIG. 3, reference numerals 301 and 303 indicate an example where CSG cells of the first and second CSG cell groups 310 and 330 send typical subframes S1 and ABSs B1 according to different ABS patterns.

Although it is assumed in FIG. 3 that PCIs allocated to the first CSG cell group 310 are reallocated to the second CSG cell group 330 in the same way, it is possible that PCIS are differently allocated to the two groups 310 and 330. In the example of FIG. 3, PCI confusion occurs because the same PCI is used between the two groups 310 and 330, but there is no problem with the PCI confusion in identifying CSG cells because a CSG cell is identified using a pair of (PCI, ABS pattern).

Figure 4:
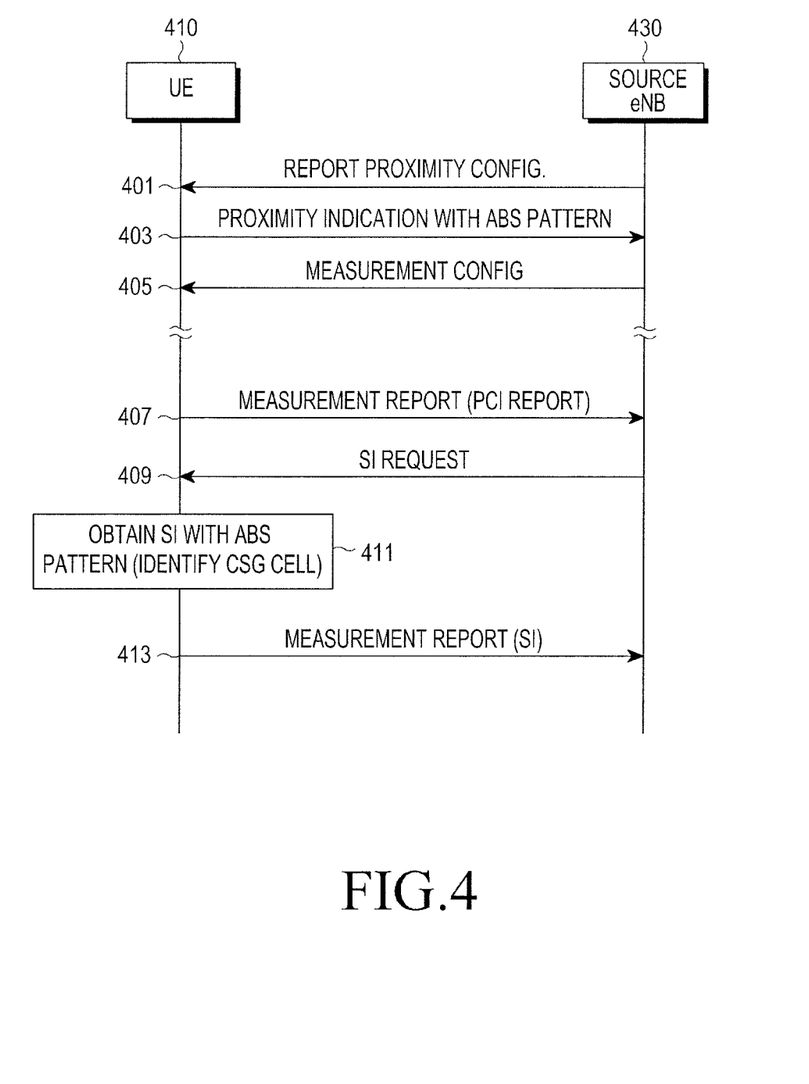
FIG. 4 is a flow chart illustrating a method for identifying a CSG cell for handover, according to an embodiment of the present disclosure.

FIG. 4 is a flow chart illustrating a method for identifying CSG cells for handover, according to an embodiment of the present disclosure, which represents a procedure of identifying an adjoining CSG cell to hand over to a target eNB (not shown) of the adjoining CSG cell from a source eNB 430 of a macrocell in the LTE network.

In operation 401, a UE 410 receives a proximity configuration message from the source eNB 430, the message instructing proximity indication. In operation 403, the UE 410 performs proximity indication that indicates whether it approaches an adjoining CSG cell by measuring reception quality of the macrocell with ABS patterns differently allocated to multiple CSG cells in accordance with the embodiment of FIG. 2, and sends the proximity indication information to a source eNB 430.

In operation 405, the UE 410 receives a measurement configuration message instructing the UE 410 to perform cell search on adjoining CSG cells from the source eNB 430. In operation 407, the UE 410 performs cell search on at least one adjoining CSG cell and accordingly obtains PCI of the at least one adjoining CSG cell. A measurement report including the PCI is sent to the source eNB 430. The UE 410 may also perform reception quality measurement on the macrocell with ABS patterns of CSG cells, including the adjoining CSG cells, during the cell search. (Such reception quality measurement using the at least one adjoining CSG cell may be selectively performed, and during the measurement, the UE 410 may measure reception quality of the macrocell e.g., in typical subframes S1 exclusive of blank subframes B1 or the UE 410 may measure reception quality of the macrocell for the entire subframes including the blank subframes B1 and typical subframes S1.)

Subsequently, in operation 409, the source eNB 430 requests the UE 410 to obtain SI for handover, and in operation 411, the UE 410 identifies ID of an adjoining CSG cell (CSG ID) through the method for identifying a CSG cell with the ABS pattern. That is, the UE 410 may identify a CSG ID of an adjoining CSG cell to be handed over with a pair of (PCI, ABS pattern) allocated to each CSG cell. For example, the CSG ID may be identified by including the CSG ID in the ABS pattern or sending information about the pair of (PCI, ABS pattern) to the source eNB 430. In another embodiment, it is also possible for the UE 410 to provide only the information about the pair of (PCI, ABS pattern) to the source eNB 430 without directly identifying the CSG ID.

Furthermore, in operation 413, the UE 410 sends the SI obtained in operation 411 to the source eNB 430. The SI includes at least one of CSG ID of a CSG cell to be handed over, CGI, and Tracking Area ID (TAI). In addition, if the SI sent by the UE 410 to the source eNB 430 includes only a CSG ID or information about a pair of (PCI, ABS pattern) (or the index information), the source eNB 430 may obtain corresponding SI (CGI, TAI, etc.) of a CSG cell corresponding to the CSG ID or the information about the pair of the (PCI, ABS pattern) by referring to a pre-stored database or over a network.

On the other hand, once the UE 410 has ever been in a CSG cell on the white list, a corresponding CGI, CSG ID, etc. of the CSG cell are already stored and thus the UE 410 may obtain the SI in a simpler procedure when the UE 410 revisits the CSG cell. The SI may also be informed to the UE together with a resource restriction pattern by extending content of the existing RRC signaling message.

According to the method of the present disclosure, operation 111 of FIG. 1 may be omitted. For example, handover delay may be drastically reduced by omitting the process of obtaining SI with the autonomous gap from the existing procedure to hand over to a CSG cell from a macrocell in RRC connection (RRC Connected) mode.

The following matters may be additionally taken into account in the cell identification method of FIG. 4.

In Discontinuous Receive (DRX) mode, if ON interval is not long enough for reception quality to be sufficiently measured, the UE may decide to use the existing procedure as shown in FIG. 1 instead of the method shown in FIG. 4. If the number of pairs of (PCI, ABS pattern) is not enough and thus there occurs overlapping of the pairs of (PCI, ABS pattern), the UE may decide to use the existing procedure of FIG. 1. Furthermore, it is also possible to apply the method of FIG. 1 only if a particular ABS pattern is determined among the multiple ABS patterns, allowing the overlapping of pairs of (PCI, ABS pattern) having the particular ABS pattern and "identifying that it is a corresponding ABS pattern allowed to overlap", and to apply the method of FIG. 4 otherwise.

Figure 5:
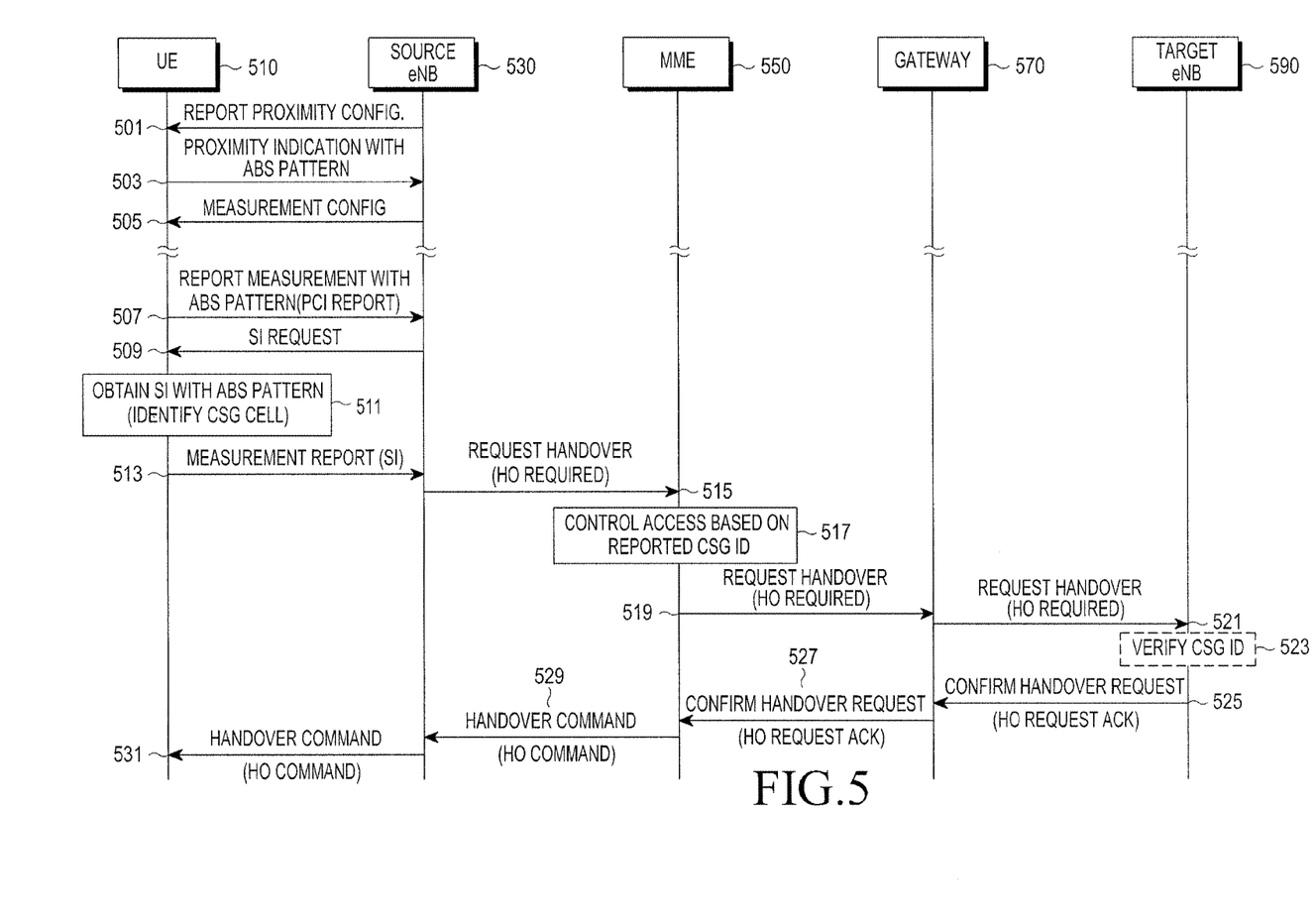
FIG. 5 is a flow chart illustrating a handover method employing the method for identifying a CSG cell, according to an embodiment of the present disclosure.

FIG. 5 is a flow chart illustrating a handover method employing the method for identifying a CSG cell, according to an embodiment of the present disclosure. In FIG. 5, UE 510 and source eNB 530 perform the same operations as corresponding elements of FIG. 4; Mobility Management Entity (MME) 550 is a network entity that manages mobility of the UE 510, such as handover; gateway 570 is a gateway of a home network that supports handover between the source eNB 530 of a macrocell and a target eNB 590 of a CSG cell; and the target eNB 590 is an eNB of the CSG cell to be handed over by the UE 510.

Description of operations 501 to 513 will be omitted herein because the operations 501 to 513 correspond to operations 401 to 413 described in FIG. 4 in that SI for handover is sent to a source eNB 530 in accordance with the method for identifying a CSG cell as described in FIG. 4. Operations 515 to 531 of FIG. 5 represent a procedure of handover from a source eNB 530 of a macrocell to a target eNB 590 of a CSG cell, which may use a procedure known to the LIE network.

In FIG. 5, the source eNB 530 that received the SI of operation 513 sends an MME 550 a message notifying that the UE 530 is in need of handover to a CSG cell, in operation 515. The message that notifies the need for handover includes a CSG ID of the CSG cell. The MME 550 performs access control for handover to the CSG cell based on the reported CSG ID, in operation 517, and sends a handover request message including the CSG ID to the gateway 570 of the home network to which the CSG cell belong, in operation 519. The target eNB 590 that received the handover request message from the gateway 570 in operation 521 compares the CSG ID received through the handover request message with its own CSG ID, and sends the handover request confirmation message to the gateway 570 in operation 525 if the CSG IDs are the same. In operation 527, the MME 550 that received the handover request confirmation message from the gateway 570 in operation 527 sends the UE's 510 handover command message to the source eNB 530 of the macrocell in operation 529, and the source eNB 530 forwards the handover command message to the UE 510 for the UE 510 to complete a procedure of handover to the CSG cell in operation 531.

Although not shown in the embodiments of the present disclosure, UE and eNBs that perform CSG cell identification and handover-related operations of FIGS. 2 to 5 may be implemented with transceivers for transmit and receive wireless signals and controllers for controlling overall operations of FIGS. 2 to 5.

The invention claimed is:

1. A method for identifying a microcell within a macrocell by a user equipment (UE) in a wireless communication system, the method comprising:
   performing a proximity indication that indicates whether the UE approaches the microcell;
   obtaining a physical identity of the microcell by performing cell search on an adjoining microcell; and
   identifying the microcell by using the physical identity and a particular pattern of a subframe sent by the microcell,
   wherein the performing of the proximity indication is based on a difference between first reception quality of the macrocell associated with the particular pattern and second reception quality of the macrocell associated with a reference pattern of the macrocell.

2. The method of claim 1, wherein the microcell is uniquely identified by using a combination of the physical identity and the particular pattern.

3. The method of claim 1, further comprising: receiving information indicating a pair of the physical identity and the particular pattern from one of the macrocell and the microcell.

4. The method of claim 1, wherein the performing of the proximity indication comprises:
   measuring the first reception quality of the macrocell with the particular pattern;
   measuring the second reception quality of the macrocell with the reference pattern of the macrocell; and
   determining that the UE approaches the microcell if the difference between the first reception quality and the second reception quality exceeds a predetermined threshold.

5. The method of claim 4, wherein the first and second reception quality are one of average reception quality or accumulated reception quality of the macrocell.

6. The method of claim 1, wherein the microcell comprises a closed subscriber group (CSG) cell.

7. The method of claim 1,
wherein the microcell comprises a closed subscriber group (CSG) cell, and
wherein the particular pattern indicates a transmission position of an almost blank subframe (ABS) for measurement of reception quality of the macrocell.

8. The method of claim 1, further comprising:
receiving and storing information indicating a pair of the physical identity and the particular pattern from one of the macrocell and the microcell.

9. The method of claim 1, wherein if there are multiple microcells in the macrocell, the particular pattern is allocated identically to the multiple microcells and the physical identity is differently allocated to the multiple microcells.

10. The method of claim 1,
wherein the particular pattern is allocated identically to multiple microcells and the physical identity is differently allocated to the multiple microcells, and
wherein if the multiple microcells are divided into a plurality of groups based on positions, the particular pattern is differently allocated between microcells belonging to different groups and the physical identity is differently reallocated between the microcells belonging to the different groups.

11. A user equipment (UE) for identifying a microcell within a macrocell in a wireless communication system, the UE comprising:
a transceiver configured to transmit and receive wireless signals; and
a controller configured to:
perform a proximity indication that indicates whether the UE approaches the microcell,
obtain a physical identity of the microcell by performing cell search on an adjoining microcell, and
identify the microcell by using the physical identity and a particular pattern of a subframe sent by the microcell,
wherein the controller is further configured to perform the proximity indication based on a difference between first reception quality of the macrocell associated with the particular pattern and second reception quality of the macrocell associated with a reference pattern of the macrocell.

12. The UE of claim 11, wherein the controller is further configured to uniquely identify the microcell by using a combination of the physical identity and the particular pattern.

13. The UE of claim 11, wherein the microcell comprises a closed subscriber group (CSG) cell.

14. The UE of claim 11,
wherein the microcell comprises a closed subscriber group (CSG) cell, and
wherein the particular pattern indicates a transmission position of an almost blank subframe (ABS) for measurement of reception quality of the macrocell.

15. The UE of claim 11, wherein the controller is further configured to receive and store information indicating a pair of the physical identity and the particular pattern from one of the macrocell and the microcell.

16. The UE of claim 11,
wherein if there are multiple microcells in the macrocell, the particular pattern is allocated identically to the multiple microcells and the physical identity is differently allocated to the multiple microcells.

17. The UE of claim 11,
wherein the particular pattern is allocated identically to multiple microcells and the physical identity is differently allocated to the multiple microcells, and
wherein if the multiple microcells are divided into a plurality of groups based on positions, the particular pattern is differently allocated between microcells belonging to different groups and the physical identity is differently reallocated between the microcells belonging to the different groups.

18. The UE of claim 11, wherein the controller is further configured to:
measure the first reception quality of the macrocell with the particular pattern,
measure the second reception quality of the macrocell with the reference pattern of the macrocell, and
determine that the UE approaches the microcell if the difference between the first reception quality and the second reception quality exceeds a predetermined threshold.

19. The UE of claim 18, wherein the first and second reception quality are one of an average reception quality or an accumulated reception quality of the macrocell.

20. A handover method from a macrocell to a microcell in a wireless communication system, the method comprising:
performing, by a user equipment (UE), a proximity indication that indicates whether the UE approaches the microcell;
obtaining, by the UE, a physical identity of the microcell by performing cell search on an adjoining microcell;
identifying, by the UE, the microcell by using the physical identity and a particular pattern of a subframe sent by the microcell;
receiving, by a source evolved node B (eNB) of the macrocell, system information resulting from an identification of the microcell from the UE; and
responding, by a target eNB of the microcell, to a handover request from the source eNB and sending, by the source eNB, a handover command to the UE,
wherein the performing of the proximity indication is based on a difference between first reception quality of the macrocell associated with the particular pattern and second reception quality of the macrocell associated with a reference pattern of the macrocell.

21. The handover method of claim 20, further comprising, performing, by the UE, a proximity indication, that indicates whether the UE approaches the microcell by means of the particular pattern before obtaining the physical identity.

22. A wireless communication system that supports handover from a macrocell to a microcell, the wireless communication system comprising:
a user equipment (UE) configured to:
perform a proximity indication that indicates whether the UE approaches the microcell,
obtain a physical identity of an adjoining microcell by performing cell search on the microcell, and
identify the microcell by using the physical identity and a particular pattern of a subframe sent by the microcell;
a source evolved node B (eNB) of the macrocell configured to:
receive system information resulting from identification of the microcell from the UE, and
send a handover command to the UE according to a handover procedure; and a target eNB of the microcell configured to respond to a handover request from the source eNB,
wherein the UE is further configured to perform the proximity indication based on a difference between first reception quality of the macrocell associated with the particular pattern and second reception quality of the macrocell associated with a reference pattern of the macrocell.

23. The wireless communication system of claim 22, wherein the UE is further configured to perform a proximity indication that indicates whether the UE approaches the microcell by means of the particular pattern.

* * * * *